United States Patent
Dellert

[15] 3,678,752
[45] July 25, 1972

[54] TESTING MEANS FOR FLUIDIC CIRCUIT ELEMENTS

[72] Inventor: Robert C. Dellert, Normal, Ill.
[73] Assignee: General Electric Company
[22] Filed: July 6, 1970
[21] Appl. No.: 52,450

[52] U.S. Cl. ................................................73/389, 73/420
[51] Int. Cl. ........................................................G01l 19/00
[58] Field of Search ................73/420, 389; 137/81.5, 594, 137/552

[56] References Cited

UNITED STATES PATENTS 3,438,397   4/1969   Gilpin ................................73/420 X

OTHER PUBLICATIONS

Fluid Amplification Symposium, May 1964, Vol. II. Harry Diamond Laboratories, pp. 181-183.

Primary Examiner—Donald O. Woodiel
Attorney—Arthur E. Fournier, Jr., David M. Schiller, Frank L. Neuhauser, Oscar B. Waddell and Joseph B. Forman

[57] ABSTRACT

A device, for use in checking the pressure of the fluid flow through each of the fluidic circuit elements of a pure fluid logic system, including a modularized read out bar having discrete compartments for each fluid line to be monitored, each compartment of the read out bar including an input port for connection to a suitable port of a given fluidic circuit element and an output port for connection to a suitable operating component of the device desired to be controlled by the given fluidic circuit element, and each compartment of the modularized read out bar further including an access port communicating with the interior of the compartment into which port a pressure sensing probe may be inserted to take a reading of the pressure of the fluid flowing through the compartment from the aforesaid suitable port of the given fluidic circuit element.

11 Claims, 4 Drawing Figures

Patented July 25, 1972

INVENTOR
ROBERT C. DELLERT

BY  *Arthur E. Lamar Jr.*

ATTORNEY

INVENTOR
ROBERT C. DELLERT

BY

ATTORNEY

TESTING MEANS FOR FLUIDIC CIRCUIT ELEMENTS

BACKGROUND OF THE INVENTION

1. Field of the Invention

My invention relates to pure fluid logic control systems, and more particularly to an improvement in means for obtaining pressure readings of the fluid flowing through each of the fluidic circuit elements of the pure fluid logic control system.

2. Description of the Prior Art

In recent years a number of companies have begun marketing fluidic elements. As used herein the term "fluidic elements" is intended to encompass fluidic devices of the type having no moving parts for containing the passage of a fluid medium such as air or gas therethrough and for controlling such passage by means of additional flow of a similar fluid medium. Since fluidic elements employ no moving parts, they are in general inherently more reliable in operation than mechanical or electrical devices capable of performing similar functions. Also, they are characterized by the fact that they can be produced at low cost due to their ease of fabrication from virtually any material that is nonporous and has structural rigidity. As a result, fluidic elements have been found to be ideal for a variety of different applications, and particularly where hazardous environmental conditions are encountered.

Generally when a malfunction occurs in a fluidic element it is because there is a blockage of the fluid flow in one of the fluid passages of the element. Such blockages may occur for any number of reasons well-known to those skilled in the art. Where a fluid logic system consists of only one fluidic element it is relatively easy to determine whether or not the fluidic element is malfunctioning and if so in what fluid passage thereof the trouble is located. Most commonly this is accomplished by removing the tubing associated with a port of the fluidic element and replacing the tubing with a suitable form of pressure sensing means. Thus by taking pressure readings of the fluid flow from each of the output ports of the fluidic element, a check is made as to whether the desired fluid output signals are being transmitted from the fluidic element. The primary disadvantage of this type of testing is that normally in removing the tubing from a given port of the fluidic element the latter element is rendered inoperative insofar as the fluid logic control system of which the fluidic element is a part is concerned until such time as the tubing is once again reconnected. Another disadvantage is that the aforesaid procedure is rather time-consuming inasmuch as it requires performance of the following steps: removal of the tubing, connection of pressure sensing means, the taking of pressure readings, removal of the pressure sensing means, and reconnection of the tubing. Finally, there is always the possibility that the tubing in the course of being reconnected to the fluidic element will not be repositioned properly such that although the fluidic element in the test just conducted may have appeared to be operating properly the inaccurate repositioning of the tubing may now cause the fluidic element to operate improperly.

However, in the case of more complex fluid logic control systems wherein a plurality of fluidic elements are fluidically interconnected it is much more difficult to determine in the event of a malfunction in the fluid logic control system which fluidic element is operating improperly and more specifically which fluid line thereof is malfunctioning. Here also for purposes of determining in which fluid line there is a malfunction, the procedure disclosed hereinabove has generally been followed. That is, the fluid output from the ports of each of the fluidic elements is tested in turn by removing the tubing therefrom and connecting a pressure sensing means in its place. In disturbing through the various fluidic interconnections between fluid elements comprising the fluid logic control system to accomplish the aforesaid check thereof, the likelihood of at least one of such interconnections being reconnected improperly is of course substantially increased.

OBJECTS OF THE INVENTION

It is therefore an object of the present invention to provide a novel and improved device for use in obtaining pressure readings of the fluid flow through each of the fluidic circuit elements of a pure fluid logic control system which device permits such pressure readings to be obtained without interrupting or interfering with the operation of the fluidic circuit element being tested or with the operation of the pure fluid logic control system as a whole.

It is another object of the present invention to provide such a device for use in obtaining pressure readings of the fluid flow through each of the fluidic circuit elements of a pure fluid logic control system which device is permanently connected as a part of the fluidic circuitry of the pure fluid logic control system.

A further object of the present invention is to provide such a device for use in obtaining pressure readings of the fluid flow through each of the fluidic circuit elements of a pure fluid logic control system which device provides a quick, easy way of checking the fluid flow output from the fluid circuit elements.

A still further object of the present invention is to provide such a device for use in obtaining pressure readings of the fluid flow through each of the fluidic circuit elements of a pure fluid logic control system which device is relatively inexpensive to manufacture, relatively easy to install and use, and is capable of being employed with various types of fluidic circuit elements.

Yet another object of the present invention is to provide a novel and improved combination of a manifold for supplying a fluid flow to one or more fluidic elements, a mounting track for supporting one or more fluidic elements, and a read-out bar for use in obtaining pressure readings of the fluid flow through each of the one or more fluidic elements of a pure fluid logic control system.

SUMMARY OF THE INVENTION

In accordance with a preferred form of the invention there is provided the combination of a manifold for supplying fluid to fluidic elements, a mounting track for supporting fluidic elements, and a pressure read-out bar. The pressure read-out bar comprises a device, for use in checking the pressure of the fluid flow through each of the fluidic circuit elements of a pure fluid logic control system. More particularly, the latter device comprises a substantially rectangular bar which is intended to be permanently positioned within a given fluidic control circuit. The bar is internally divided into a plurality of isolated compartments. Each of these compartments has three ports formed therein affording access from the exterior of the bar to the interior of the respective compartment, and arranged relative to each other such that there is provided a through passageway in the bar and a passageway at right angles thereto and communicating therewith. One of these ports located at one end of the through passageway is connected by a flexible tube to a given output port of one of the fluidic elements employed in the fluidic control circuit. The opposed port located at the other end of the through passageway is intended to be connected to a suitable operating component of the device desired to be controlled by the fluidic circuit. The last of the three access ports has positioned therein a rubber duck-bill like member. The resiliency of this duck-bill is such that the duck-bill will normally close upon itself thus internally closing off the latter port from the atmosphere. However, the resiliency of this duck-bill is also such that a suitable pressure sensing probe may be inserted into the port for purposes of obtaining a measurement of the pressure of the fluid entering the bar from the aforementioned flexible tube and exiting from the bar through the port at the other end of the through passageway. Merely by taking readings in each of the isolated compartments, it is relatively simple to tell from these pressure readings the portion of the fluidic control circuit which may be malfunctioning.

The invention will be more fully understood from the following detailed description and its scope will be pointed out in the appended claims.

DESCRIPTION OF A PREFERRED EMBODIMENT

Figure 1:
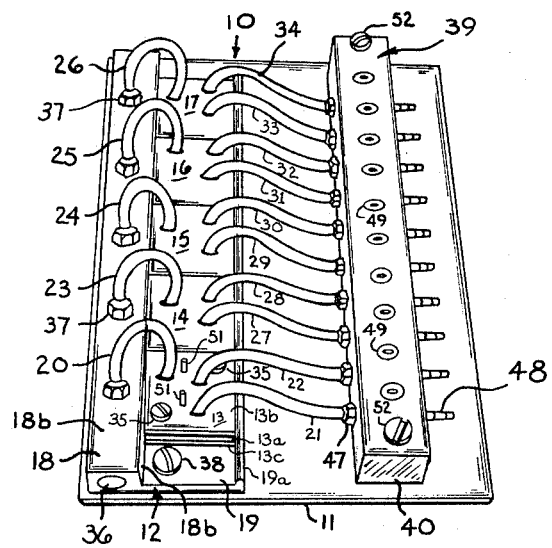
FIG. 1 is a perspective view of a pure fluid logic control system with a device in accordance with the present invention for use in obtaining pressure readings of the fluid flow through each of the fluidic circuit elements of a pure fluid logic control system illustrated fluidically interconnected with the components of the pure fluid logic control system.

Referring now to FIG. 1 of the drawing the fluid logic system 10 of the invention is illustrated including a pressure read-out bar fluidically interconnected as an integral portion of the fluidic circuitry of the system 10 and suitably mounted on a supporting member 11 along with the associated fluidic circuitry of the system 10 in a manner to be more fully described hereinafter. At this point however it is merely necessary to note that a compact, essentially pre-packaged assembly has been provided having the capability for greatly facilitating the handling and installation thereof.

For purposes of describing the invention a particular embodiment of pure fluid logic control system has been selected for illustration. However, it is to be understood that the invention is not limited to use merely with the particular pure fluid logic control system illustrated in the drawing but rather is capable of being used with other pure fluid logic control systems which may differ from the pure fluid logic control system 10 insofar as the types and numbers of components employed in the system is concerned.

The pure fluid logic control system 10 comprises a plurality of fluidic elements suitably mounted in a row by mounting means 12 in a manner to be more fully described hereinafter. For purposes of illustration, the pure fluid logic control system 10 is shown as including a total of five fluidic elements 13, 14, 15, 16 and 17, respectively. However as noted previously a greater or lesser number of fluidic elements might equally well be utilized in the pure fluid logic control system 10 depending on the nature of the function which it is desired to have the latter perform. Preferably the mounting means 12 takes the form of a substantially L-shaped combination manifold 18 and mounting track 19. Although as shown in FIG. 1 the manifold 18 and mounting track 19 comprise a single member, it is to be understood that the manifold 18 and mounting track 19 might also if it were so desired comprise separate members.

Inasmuch as the general construction and method of operation of fluidic elements per se is well-known to those skilled in the art and inasmuch as the particular details thereof form no part of the instant invention, it has not been deemed necessary for an understanding of the present invention to include herein a detailed description of the fluidic elements. Rather there is provided merely a brief description of the construction and method of operation of fluidic element 13, which is intended to exemplify the construction and method of operation of all five of the fluidic elements, i.e., elements 13, 14, 15, 16 and 17 which are included in the pure fluid logic control system 10. The fluidic elements 13, 14, 15, 16 and 17 may for example be of the design disclosed in U.S. Pat. No. 3,181,546 assigned to the same assignee as the present invention. Thus, in conventional fashion, the fluidic element 13 includes a flat plate 13a formed of any suitable nonporous, structurally rigid material, such as metal, glass, plastic, or the like, which is slotted in a special configuration to provide passages for fluid. The various passages (not shown) in plate 13a may be formed in any suitable manner and may extend entirely through the plate 13a or may be of lesser depth as desired. It is to be understood that the material from which the plate 13a is formed must be nonreactive with the fluid material flowing through the fluidic element 13. The fluid flow is confined within the passages by means of suitable enclosures such as cover plates 13b and 13c, respectively, which are positioned on opposite sides of plate 13a. The slots which define the fluid passages are preferably rectangular in cross section, although other cross sections such as circular, may be employed.

Fluidic element 13 includes a primary or power inlet means which provides a primary or power fluid flow which is to be controlled in a manner to be described. The primary fluid inlet means includes a passage or conduit (not shown) having a first end suitably connected to one end of tubing 20 which has its other end connected to a source of pressurized primary or power fluid in a manner to be set forth more fully hereinafter. As described in greater detail in U.S. Pat. No. 3,199,782, which is assigned to the same assignee as the present invention, the aforementioned conduit extends in a direction preferably perpendicular to the plane containing the fluid flow configuration of the fluidic element 13. The second end of the aforesaid conduit is in fluid communication with a fluid passage terminating in a restricted zone forming a nozzle adapted to generate a power fluid flow in the form of a power jet of fluid issuing therefrom. The power fluid issuing from the aforesaid nozzle passes into an interaction chamber which is defined by a pair of diverging side walls. The fluid jet issuing from the nozzle normally attaches to one or the other of the side walls and remains in such state of attachment if left undisturbed. Generally, a pair of secondary or control fluid flow inlet means 51 positioned within the side walls of the interaction chamber adjacent the power nozzle, and on opposite sides of the center line thereof are provided for purposes of detaching the power jet from one side wall and switching or flipping it to the opposite wall. A pair of fluid flow outlet means or receivers are disposed downstream from the primary fluid inlet means and are adapted to selectively receive the fluid of the power jet, the particular receiver obtaining the fluid being determined by the attached position of the power jet. Each of the aforesaid pair of receivers of fluid element 13 includes a passage or conduit (not shown) having its output end suitably connected to one end of tubings 21 and 22, respectively. Thus, as illustrated in FIG. 1 of the drawing, fluidic element 13 has its power inlet means connected to tubing 20 and its receivers connected to tubings 21 and 22, respectively. Similarly, the other four fluidic elements, i.e., elements 14, 15, 16 and 17 have their power inlet means connected to a suitable source of pressurized fluid by means of tubings 23, 24, 25 and 26, respectively, and their corresponding pair of receivers connected to tubings 27 and 28, 29 and 30, 31 and 32, and 33 and 34, respectively.

Referring again to FIG. 1 of the drawing, the five fluidic elements 13, 14, 15, 16 and 17 are each supported in the mounting track portion of mounting means 12. For this purpose mounting track 19 is preferably provided with a plurality of threaded holes (not shown) suitably spaced so as to permit the fluidic elements 13, 14, 15, 16 and 17 to be supported in the space extending between upstanding flange 19a of mounting track 19 and the inner side wall 18a of manifold 18. With the fluidic elements 13, 14, 15, 16 and 17 positioned in the aforedescribed manner, suitable fastening means such as screws 35 are threaded into the aforementioned threaded holes in mounting track 19. In the interest of clarity of illustration screws 35 have been shown only in connection with fluidic element 13 although it is to be understood that similar screws though not shown in FIG. 1 are also intended to be utilized to secure each of fluidic elements 14, 15, 16 and 17 to the mounting track 19. As seen with reference to FIG. 1 of the drawing, the fluidic elements 13, 14, 15, 16 and 17 are secured to the mounting track 19 such that the side walls of adjoining fluidic elements are in substantially juxtaposed abutting relation.

Manifold 18 is provided with an internal passage 36 extending the length thereof. In addition upper wall 18b of manifold 18 is provided with a plurality of suitably spaced threaded openings (not shown). Each of the aforesaid openings extends from the top surface of upper wall 18b downwardly a sufficient extent so as to be in communication with internal passage 36. A suitable fitting generally designated in FIG. 1 of the drawing by reference number 37 is threaded into each of the aforementioned spaced openings in upper wall 18b. For purposes of description, the manifold 18 has been illustrated as having a total of five openings, each receiving a fitting 37. The fittings 37 are each connected to the other end from that previously described of tubings 20, 23, 24, 25 and 26. It is thus seen that the tubings 20, 23, 24, 25 and 26 connect the power inlet means of fluidic elements 13, 14, 15, 16 and 17, respectively, to fittings 37 and thereby to the internal passage 36 of manifold 18. The internal passage 36 in turn is suitably connected (not shown) in a manner well-known to those skilled in the art to a source of pressurized fluid. Thus, as the pressurized fluid is supplied to the internal passage 36 it flows therethrough and thence through fittings 37 and tubings 20, 23, 24, 25 and 26 to the power inlet means of the fluidic elements 13, 14, 15, 16, and 17, respectively. From the power inlet means of the respective fluidic elements 13, 14, 15, 16 and 17 the pressurized fluid flows through the various internal passages of the fluidic elements in the manner previously described hereinbefore and depending on the configuration of the aforesaid internal passages exits through one of the pair of corresponding receivers of the fluidic elements 13, 14, 15, 16 and 17. Depending on which of the receivers receives the pressurized fluid, there is supplied a fluid output to at least some of the tubings 21 and 22, 27 and 28, 29 and 30, 31 and 32, and 33 and 34 which are each connected to one of the receivers of the fluidic elements 13, 14, 15, 16 and 17. The mounting means 12 comprising manifold 18 and mounting track 19 is preferably secured to a suitable supporting member 11 by a pair of fasteners 38 (only one of which can be seen in FIG. 1) which pass through suitable openings (not shown) provided therefor in mounting track 19 and are received in threaded openings (not shown) suitably provided in supporting member 11.

Figure 4:
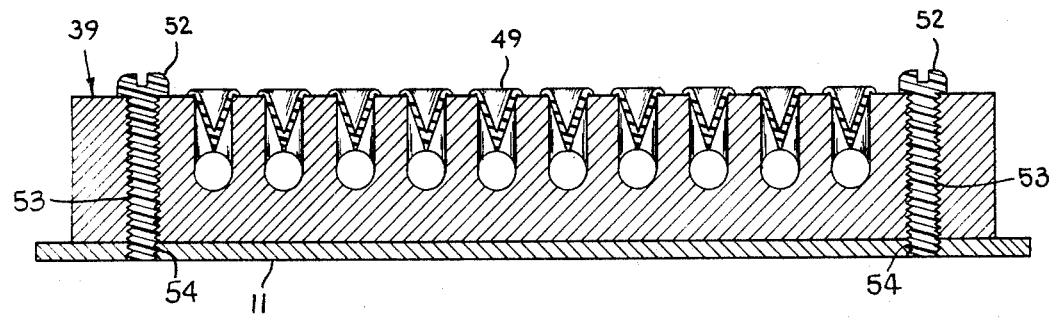
FIG. 4 is a longitudinal sectional view through the device of FIG. 1 illustrating the isolated nature of the compartments of the device.

As illustrated in FIG. 1 of the drawing, a device generally designated by reference numeral 39 for use in checking the pressure of the fluid flow through each of the fluidic elements 13, 14, 15, 16 and 17 of pure fluid logic control system 10 is fluidically interconnected as an integral portion of the fluidic circuitry of pure fluid logic control system 10. In accordance with the illustrated preferred embodiment of the invention, the device 39 comprises a substantially rectangular bar 40 which is intended to be permanently positioned within a given fluidic control circuit. The bar 40 as best seen with reference to FIGS. 2 and 4 of the drawing is internally divided into a plurality of isolated compartments 41. Each of these compartments 41 has three ports 42, 43 and 44 formed therein affording access from the exterior of the bar 40 to the interior of the respective compartment 41, and arranged relative to each other such that there is provided a through passageway 45 in the bar 40 and a passageway 46 at right angles thereto and communicating therewith.

Figure 2:
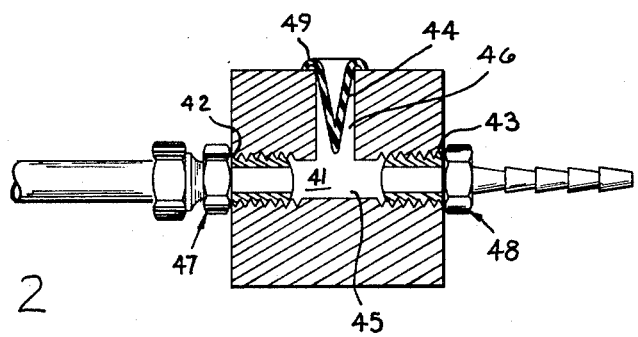
FIG. 2 is a transverse sectional view through one of the isolated compartments of the device of FIG. 1.
Figure 3:
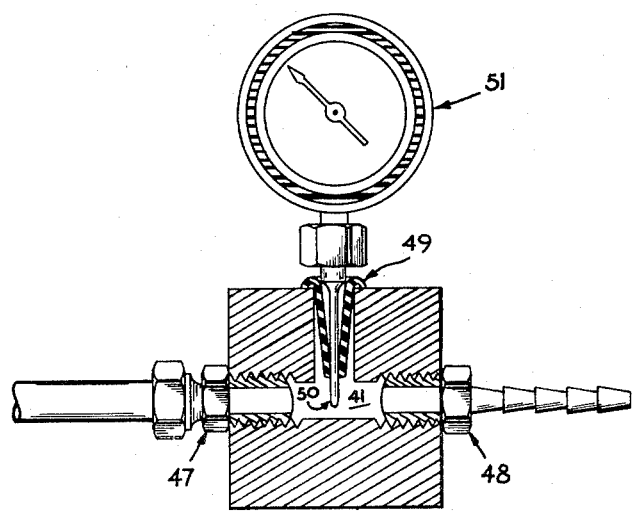
FIG. 3 is a transverse sectional view similar to FIG. 2 through one of the isolated compartments of the device of FIG. 1 but with a pressure sensing probe illustrated inserted in one of the access ports of the aforesaid compartment.

Referring to FIGS. 2 and 3 of the drawing, ports 42 and 43 are each internally threaded so as to be capable of receiving suitable fittings such as the fittings 47 and 48 illustrated in the aforesaid FIGURES. Fitting 47 threaded in port 42 such as to be located at one end of the through passageway 45 is connected to a given one of the tubings 21, 22, 27-34. For purposes of description, the bar 40 is illustrated as including a total of ten compartments 41. Thus, each of the receivers of fluidic elements 13, 14, 15, 16 and 17 is capable of being fluidically interconnected with one of the isolated compartments 41 of bar 40. It is to be understood however that the bar 40 might include a greater or a lesser number of isolated compartments 41 depending on the number of fluidic elements that were intended to be employed in a given pure fluid logic control system. The fitting 48 threaded into port 43 located at the other end of the through passageway 45 is intended to be connected by suitable means such as a tubing (not shown) to a suitable operating component of the device desired to be controlled by the fluidic circuit of pure fluid logic control system 10.

The last of the three access ports, i.e., port 44 has associated therewith closure means normally closing the open end of the port 44 to atmosphere. In the preferred embodiment illustrated, the closure means comprises a duck-bill like member 49 preferably formed of rubber. The duck-bill like member 49 may be retained in the port 44 in any suitable manner such as for example through the frictional engagement of the outer surface of the duck-bill like member 49 with the side walls of the port 44. The resiliency of the duck-bill 49 is such that the duck-bill 49 will normally close upon itself as shown in FIG. 2 of the drawing thus internally closing off the latter port 44 from the atmosphere. However the resiliency of the duck-bill 49 is also such that a suitable probe in the manner illustrated in FIG. 3 of the drawing may be inserted into the port 44 for purposes of obtaining a measurement of the presence of the fluid entering the bar 40 from the aforementioned tubing connected to fitting 47 and exiting from the bar 40 through the port 43 and fitting 48 at the other end of the through passageway 45. For purposes of obtaining the aforesaid pressure reading any suitable type of probe may be inserted into the port 44 through duck-bill 49. Thus, the probe 50 with pressure gage 51 associated therewith in FIG. 3 of the drawing is intended to be merely illustrative of a suitable type of probe capable of being utilized for the aforedescribed purpose. Finally in accordance with the preferred embodiment of the invention the device 39 comprising bar 40 is secured to supporting member 11 in the manner illustrated in FIG. 1 of the drawing through the use of suitable means such as a pair of threaded fasteners 52 which pass through openings 53 provided therefor in bar 40 and are received in threaded openings 54 suitably provided for this purpose in supporting member 11. It is thus seen from FIG. 1 of the drawing that the supporting member 11 functions as a convenient means for providing a compact, essentially pre-packaged assembly of the pure fluid control system 10 and the device 39 thereby facilitating the handling and installation thereof.

Insofar as concerns the operation of the pure fluid logic control system 10, pressurized fluid from a suitable source is supplied to the manifold 18 and therefrom to the power inlet means of the fluidic elements 13, 14, 15, 16 and 17 through the tubular interconnection provided therebetween. From the power inlet means the pressurized fluid flows through the various internal passages of the fluidic elements and depending on the configuration of the aforesaid internal passages exits through one of the pair of corresponding receivers of the fluidic elements. Depending on which of the receivers receives the pressurized fluid, there is supplied a fluid output to at least some of the tubings which are connected to the receivers of the fluidic elements 13, 14, 15, 16 and 17. The fluid outputs are thence transmitted through the latter tubings to a suitable operating component of the device desired to be controlled by the fluidic circuitry of pure fluid logic control system 10. In order to determine whether or not the proper fluid outputs are being supplied from the fluidic elements 13, 14, 15, 16 and 17 to the device or devices desired to be controlled thereby the following procedure is followed. A suitable probe such as the probe 50 and associated gage 51 is inserted into one of the ports 44 through the duck-bill 49 positioned therein and a reading is taken of the fluid flow passing through the corresponding isolated compartment 41. This procedure is continued in sequence until a pressure reading is obtained of the fluid flow present in each of the isolated compartments 41. Based on the readings obtained in the aforesaid manner, it is relatively simple to tell from these pressure readings which, if any, portion of the fluidic circuit of pure fluid logic control system 10 may be malfunctioning. Since each of the compartments 41 is fluidically isolated from each of the other compartments provided in bar 40, each reading obtained from a compartment 41 will accurately reflect the fluid output being supplied thereto from a given receiver of a fluidic element, thus permitting the malfunctioning portion of the fluidic circuit to be readily identified. Further, it has been found that the permanent positioning the the device 39 in the fluidic circuit of the pure fluid logic control system 10 does not adversely affect the normal operation of the pure fluid logic control system 10. That is, notwithstanding the presence of device 39, the pure fluid logic control system 10 is still capable of performing the desired function of controlling the particular operating components associated therewith.

Thus, in accordance with the present invention there has been provided a novel and improved device for use in obtaining pressure readings of the fluid flow through each of the fluidic circuit elements of a pure fluid logic control system. The subject device which is permanently connected as a part of the fluidic circuitry of the pure fluid logic control system permits such pressure readings to be obtained while the system continues to function. That is, the taking of readings does not interrupt or interfere with the operation of the fluidic circuit element being tested or with the operation of the pure fluid logic control system as a whole. By utilizing the subject device, the heretofore existing requirement that the tubing from the receiver of the fluidic element be removed to permit a reading to be taken has been obviated. Concomitantly the possibility that the tubing after a reading has been obtained might be reconnected inaccurately has been eliminated. It is readily seen therefore that the subject device in accordance with the present invention provides a quick, easy way of checking the fluid flow output from the fluidic circuit elements. In addition, the subject device is characterized by being relatively inexpensive to manufacture, relatively easy to install and use, and by being capable of being employed with various types of fluidic circuit elements.

While only one embodiment of my invention has been shown, it will be appreciated that many modifications thereof may readily be made by those skilled in the art. For example, it is to be understood that the device 39 is not limited to use solely with the particular pure fluid logic control system illustrated in FIG. 1 of the drawing, but rather is also capable of being employed with other pure fluid logic control systems which may differ from the pure fluid logic control system 10 insofar as the types and numbers of components utilized in the system is concerned. In addition, the bar 40 of the device 39 may include a greater or lesser number of isolated compartments 41 depending on the need therefor as dictated by the particular number of fluidic elements that it is desired to be capable of being tested. Further, although the device 39 has been described and illustrated in conjunction with measuring the pressure of the fluid flow from the output receivers of the fluidic elements, it is also contemplated that the device 39 may be fluidically interconnected with other ports of a fluidic element such as for example the control inlet ports of a fluidic element to measure the pressure of the fluid flow thereto. I therefore intend by the appended claims to cover the above modifications as well as all other modifications which fall within the true spirit and scope of my invention.

What I claim as new and desire to secure by Letters Patent of the United States is:

1. In a pure fluid system including at least one fluidic circuit element, test means for use in obtaining a pressure reading of the fluid flow through said one fluidic circuit of said pure fluid system comprising:
   a. a device comprising a substantially rectangular bar;
   b. said device being internally divided into a plurality of isolated compartments;
   c. said plurality of isolated compartments each having three communicating ports formed therein, said three ports having open ends opening at the exterior of said device and affording access from the exterior of said device to the interior of the corresponding one of said plurality of isolated compartments;
   d. means connecting a first of said three ports of each of said plurality of isolated compartments to said one fluidic circuit element, said means transmitting said fluid flow from said one fluidic circuit element through said first of said three ports of each of said plurality of isolated compartments to said interior of the corresponding one of said plurality of isolated compartments;
   e. a second of said three ports of each of said plurality of isolated compartments comprising an output port from said device for said fluid flow received from said one fluidic circuit element; and
   f. closure means normally closing the open end of the third of said three ports of each of said plurality of isolated compartments, said closure means being openable to admit a probe for measuring the pressure of fluid flowing in said first and second of said three ports of the corresponding one of said plurality of isolated compartments.

2. In a pure fluid system including at least one fluidic circuit element, test means as set forth in claim 11 wherein:
   a. said closure means includes a duck-bill like member formed of resilient material;
   b. means retaining said duck-bill member in the third of said three ports of the corresponding one of said plurality of isolated compartments;
   c. said resilient material of said duck-bill like member having a resiliency such that said duck-bill like member normally closes upon itself to close off said third of said three ports of the corresponding one of said plurality of isolated compartments from the atmosphere; and
   d. said resilient material of said duck-bill like member further having a resiliency such that a probe may be inserted into said third of said three ports of the corresponding one of said plurality of isolated compartments through said duck-bill like member for purposes of obtaining a measurement of the pressure of said fluid flow from said one fluidic circuit element entering said device through said first and said three ports of the corresponding one of said plurality of isolated compartments and exiting from said device through said second of said three ports of the corresponding one of said plurality of isolated compartments.

3. In a pure fluid system including at least one fluidic circuit element, test means as set forth in claim 11 wherein:
   a. said means connecting said first of said three ports of each of said plurality of isolated compartments to said one fluidic circuit element comprises first fitting means threaded into said first of said three ports of the corresponding one of said plurality of isolated compartments and a tubing having one end connected to said first fitting means and the other end connected to said one fluidic circuit element; and
   b. a second fitting means is threaded into said second of said three ports of each of said plurality of isolated compartments.

4. In a pure fluid system including at least one fluidic circuit element, test means as set forth in claim 11 wherein:
   a. said three ports of each of said plurality of isolated compartments are arranged relative to each other such as to provide a through passageway in the corresponding one of said plurality of isolated compartments in said device and a passageway at right angles thereto;
   b. said first of said three ports of the corresponding one of said plurality of isolated compartments is located at one end of said through passageway;
   c. said second of said three ports of the corresponding one of said plurality of isolated compartments is located at the other end of said through passageway; and
   d. said third of said three ports of the corresponding one of said plurality of isolated compartments is located at the outer end of said passageway which is at right angles to said through passageway.

5. In a pure fluid logic control system including at least one fluidic circuit element having power inlet means connected to a source of pressurized fluid and a pair of fluid flow outlet means, the improvement comprising a device for obtaining a pressure reading of the fluid flow issuing from said pair of fluid flow outlet means of said one fluidic circuit element, said device comprising:
 a. a substantially rectangular bar internally divided into at least a pair of isolated compartments;
 b. each of said pair of isolated compartments having three communicating ports formed therein affording access from the exterior of said bar to the interior of each of said pair of isolated compartments, said three ports of each of said pair of isolated compartments being arranged relative to each other so as to provide a through passageway in each of said pair of isolated compartments and a passageway at right angles thereto;
 c. first means connecting a first of said three ports of one of said pair of isolated compartments to one of said pair of fluid outlet means of said one fluidic circuit element, said first means transmitting said fluid flow from said one of said pair of fluid outlet means of said one fluidic circuit element through said first of said three ports of said one of said pair of isolated compartments to said interior of said one of said pair of isolated compartments;
 d. said first of said three ports of said one of said pair of isolated compartments being located at one end of said through passageway of said one of said pair of isolated compartments;
 e. a second of said three ports of said one of said pair of isolated compartments being located at the other end of said through passageway of said one of said pair of isolated compartments, said second of said three ports of said one of said pair of isolated compartments comprising an output port from said one of said pair of isolated compartments for said fluid flow received from said one of said pair of fluid output means of said one fluidic circuit element;
 f. a first duck-bill like member retained in the third of said three ports of said one of said pair of isolated compartments;
 g. said first duck-bill like member being formed of resilient material having a resiliency such that said first duck-bill like member normally closes upon itself to close off said third of said three ports of said one of said pair of isolated compartments from the atmosphere, and further having a resiliency such that a probe may be inserted into said third of said three ports of said one of said pair of isolated compartments through said first duck-bill like member for purposes of obtaining a measurement of the pressure of said fluid flow from said one of said pair of fluid output means of said one fluidic circuit element entering said one of said pair of isolated compartments through said first of said three ports thereof and exiting from said one of said pair of isolated compartments through said second of said three ports thereof;
 h. second means connecting a first of said three ports of the other of said pair of isolated compartments to the other of said pair of fluid outlet means of said one fluidic circuit element, said second means transmitting said fluid flow from said other of said pair of fluid outlet means of said one fluidic circuit means through said first of said three ports of said other of said pair of isolated compartments to said interior of said other of said pair of isolated compartments;
 i. said first of said three ports of said other of said pair of isolated compartments being located at one end of said through passageway of said other of said pair of isolated compartments;
 j. a second of said three ports of said other of said pair of isolated compartments being located at the other end of said through passageway of said other of said pair of isolated compartments, said second of said three ports of said other of said pair of isolated compartments comprising an output port from said other of said pair of isolated compartments for said fluid flow received from said other of said pair of fluid output means of said one fluidic circuit element;
 k. a second duck-bill like member retained in the third of said three ports of said other of said pair of isolated compartments; and
 l. said second duck-bill like member being formed of resilient material having a resiliency such that said second duck-bill like member normally closes upon itself to close off said third of said three ports of said other of said pair of isolated compartments from the atmosphere, and further having a resiliency such that a probe may be inserted into said third of said three ports of said other of said pair of isolated compartments through said second duck-bill like member for purposes of obtaining a measurement of the pressure of said fluid flow from said other of said pair of fluid output means of said one fluidic circuit element entering said other of said pair of isolated compartments through said first of said three ports thereof and exiting from said other of said pair of isolated compartments through said second of said three ports thereof.

6. In a pure fluid logic control system, the improvement of a device as set forth in claim 6 wherein:
 a. said first means connecting said first of said three ports of said one of said pair of isolated compartments to said one of said pair of fluidic outlet means of said one fluidic circuit element comprises first fitting means threaded into said first of said three ports of said one of said pair of isolated compartments and a first tubing having one end connected to said first fitting means and the other end connected to said one of said pair of fluid output means of said one fluidic circuit element;
 b. a second fitting means is threaded into said second of said three ports of said one of said pair of isolated compartments;
 c. said second means connecting said first of said three ports of said other of said pair of isolated compartments to said other of said pair of fluid outlet means of said one fluidic circuit element comprises third fitting means threaded into said first of said three ports of said other of said pair of isolated compartments and a second tubing having one end connected to said third fitting means and the other end connected to said other of said pair of fluid output means of said one fluidic circuit element; and
 d. a fourth fitting means is threaded into said second of said three ports of said other of said pair of isolated compartments.

7. A pure fluid logic control system comprising in combination:
 a. a support member,
 b. mounting means mounting a plurality of fluidic devices in a row along the support member,
 c. each of said fluidic devices having a power fluid inlet conduit and at least one other fluid conducting conduit,
 d. a manifold on said support member extending parallel to said row of fluidic devices at one side of said fluidic devices,
 e. first tubing connecting said manifold and said power fluid inlet conduits,
 f. a read-out bar on said support member extending parallel to said manifold at the other side of said fluidic devices,
 g. said read-out bar having a plurality of isolated compartments spaced along its length, each compartment including a passage extending transversely on said bar entirely therethrough and a port communicating with said passage and having an open end opening at a surface of said read-out bar,
 h. second tubing connecting each of said other fluid conducting conduits and a separate one of said passages, and i. closure means normally closing the open end of said port, said closure means being openable to admit a probe for measuring the pressure of fluid flowing through said passage.

8. A system as defined in claim 8 wherein said mounting means includes a mounting track integrally connected to said manifold.

9. A system as defined in claim 8 wherein said closure means comprises a duck-bill like member formed of resilient material retained in said port, said duck-bill like member being adapted to receive a probe for extension therethrough into said port for measuring pressure of fluid flowing through said passage.

10. In a pure fluid system including at least one fluidic circuit element, test means for use in obtaining a pressure reading of the fluid flow through said one fluidic circuit of said pure fluid system comprising:
   a. a device internally divided into a plurality of isolated compartments;
   b. said plurality of isolated compartments each having three communicating ports formed therein, said three ports having open ends opening at the exterior of said device and affording access from the exterior of said device to the interior of the corresponding one of said plurality of isolated compartments;
   c. means connecting a first of said three ports of each of said plurality of isolated compartments to said one fluidic circuit element, said means transmitting said fluid flow from said one fluidic circuit element through said first of said three ports of each of said plurality of isolated compartments to said interior of the corresponding one of said plurality of isolated compartments;
   d. a second of said three ports of each of said plurality of isolated compartments comprising an output port from said device for said fluid flow received from said one fluidic circuit element; and
   e. closure means normally closing the open end of said third of said three ports of each of said plurality of isolated compartments, said closure means being openable to admit a probe for measuring the pressure of fluid flowing in said first and second of said three ports of the corresponding one of said plurality of isolated compartments.

11. In a pure fluid system including at least one fluidic circuit element, test means for use in obtaining a pressure reading of the fluid flow through said one fluidic circuit element of said pure fluid system comprising:
   a. a device comprising a substantially rectangular bar, said bar including at least one internal isolated compartment;
   b. said internal isolated compartment having three communicating ports formed therein, said three ports having open ends opening at the exterior of said device and affording access from the exterior of said device to the interior of said internal isolated compartment;
   c. means connecting a first of said three ports to said one fluidic circuit element, said means transmitting said fluid flow from said one fluidic circuit element through said first of said three ports to said interior of said internal isolated compartment;
   d. a second of said three ports comprising an output port from said device for said fluid flow received from said one fluidic circuit element; and
   e. closure means normally closing the open end of said third of said three ports, said closure means being openable to admit a probe for measuring the pressure of fluid flowing in said first and second of said three ports.

* * * * *